July 16, 1929.  J. DEGERTH  1,721,433
GEARING FOR REVOLVING SPINDLES
Filed Dec. 11, 1926

INVENTOR
JOHN DEGERTH
BY
ATTORNEYS

Patented July 16, 1929.

1,721,433

UNITED STATES PATENT OFFICE.

JOHN DEGERTH, OF HELSINGFORS, FINLAND, ASSIGNOR TO MASKIN-OCH BROBYGG-NADS AKTIEBOLAGET, OF HELSINGFORS, FINLAND.

GEARING FOR REVOLVING SPINDLES.

Application filed December 11, 1926, Serial No. 154,269, and in Germany December 23, 1925.

It is usual to drive quick revolving spindles by means of worm and worm wheels.

The present invention increases the life of the gearing and makes it possible to use the worm wheel at least twice as long time as previously.

The drawing shows one way of carrying out the idea.

Figure 1:
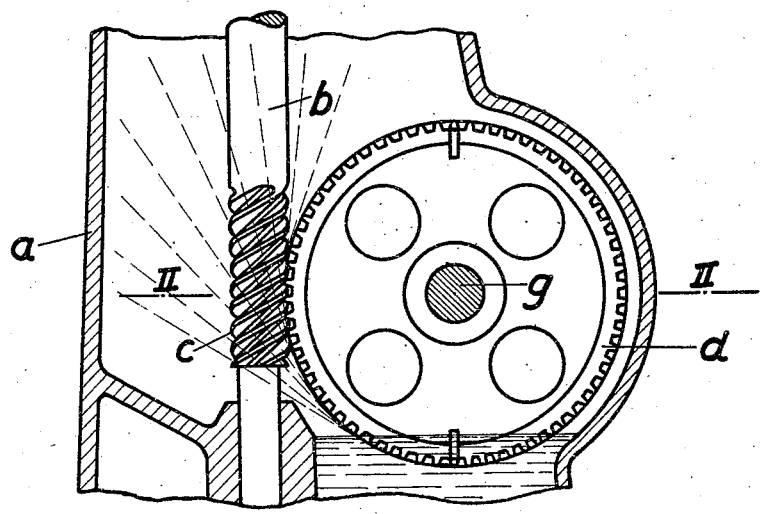
Fig. 1 shows a section through the gearing of cream separator.
Figure 2:
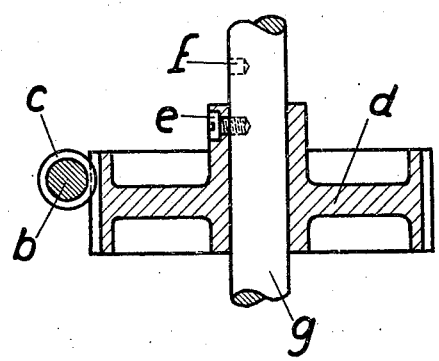
Fig. 2 shows a cut through the line II—II in Fig. 1.
Figure 3:
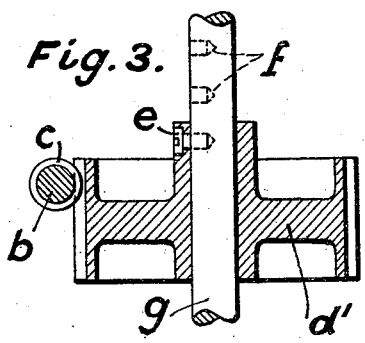
Fig. 3 is a similar view of a modification.

$a$ is the separator frame, $b$ the vertical driving spindle for the separator bowl with its teeth $c$. The teeth of the worm wheel $d$ gear in the teeth of the spindle but as it will be seen from the drawing the tooth rim of the wheel is broader. As soon as the worm wheel is worn in the position shown in Fig. 2 the worm wheel may be moved on the shaft and fixed in a new position $f$ by the fixing screw $e$, when a new surface of the teeth is available for driving the spindle. If wanted the tooth rim may be made so broad that the wheel may be used in more than two positions, as shown in Fig. 3, wherein the toothed rim of the worm wheel $d'$ is of a width to permit the wheel to be moved into three positions.

Claims:

1. A gearing, comprising a spindle having a worm stationary with respect thereto, a shaft at right angles to the spindle, a worm wheel on the shaft and meshing with the worm, said worm wheel having a toothed periphery of a width sufficient to permit the worm to be slid on the shaft into a plurality of predetermined positions, the distance between the said positions being approximately equal to the diameter of the worm, and means for rigidly locking the worm wheel to the shaft in any of the said positions, said means being mounted on one of the said parts and engaging the other, whereby the worm wheel can be held with a portion of its teeth in mesh with the worm until said teeth become worn when it can be shifted and held with an other unworn portion of its teeth in mesh with the said worm, thereby prolonging the life of said worm wheel.

2. A gearing, comprising a spindle having a worm stationary with respect thereto, a shaft at right angles to the spindle, a worm wheel on the shaft and meshing with the worm, said worm wheel having a toothed periphery of a width at least twice the diameter of the worm and slidable on the shaft into a plurality of predetermined positions, the distance between the positions being approximately equal to the diameter of the worm, and means for rigidly locking the worm wheel to the shaft in any of the predetermined positions, said means consisting of a screw in the hub of the worm wheel and engaging recesses in the shaft.

JOHN DEGERTH.